(12) United States Patent
Dezouche

(10) Patent No.: US 7,753,651 B2
(45) Date of Patent: Jul. 13, 2010

(54) BALANCING FLYWEIGHT, ROTOR DISK EQUIPPED THEREWITH, ROTOR AND AIRCRAFT ENGINE COMPRISING THEM

(75) Inventor: Laurent Gilles Dezouche, Le Coudray Montceau (FR)

(73) Assignee: SNECMA, Paris (FR)

( * ) Notice: Subject to any disclaimer, the term of this patent is extended or adjusted under 35 U.S.C. 154(b) by 732 days.

(21) Appl. No.: 11/622,667

(22) Filed: Jan. 12, 2007

(65) Prior Publication Data

US 2010/0135774 A1 Jun. 3, 2010

(30) Foreign Application Priority Data

Jan. 13, 2006 (FR) .................................. 06 50125

(51) Int. Cl.
*F01D 5/10* (2006.01)
(52) U.S. Cl. ............... 416/145; 416/193 A; 416/219 R; 416/220 R; 416/500
(58) Field of Classification Search ................. 416/145, 416/190, 193 A, 189, 219 R, 220 R, 500
See application file for complete search history.

(56) References Cited

U.S. PATENT DOCUMENTS

| | | | | |
|---|---|---|---|---|
| 3,957,270 A | * | 5/1976 | Fekete | ......................... 473/592 |
| 4,093,226 A | * | 6/1978 | Priestle | ..................... 273/341.1 |
| 4,355,957 A | * | 10/1982 | Sifford et al. | ............... 416/145 |
| 4,872,812 A | * | 10/1989 | Hendley et al. | ............. 416/190 |
| 5,018,943 A | | 5/1991 | Corsmeier et al. | |
| 5,156,528 A | * | 10/1992 | Bobo | ......................... 416/190 |
| 6,042,336 A | * | 3/2000 | Bulgrin et al. | .............. 416/145 |
| 6,659,725 B2 | * | 12/2003 | Yeo et al. | ..................... 416/190 |
| 6,769,877 B2 | * | 8/2004 | Martin et al. | ........... 416/193 A |
| 2005/0191181 A1 | | 9/2005 | Bertrand et al. | |

FOREIGN PATENT DOCUMENTS

| EP | 1 052 424 A2 | 11/2000 |
|---|---|---|
| FR | 2 358 545 | 2/1978 |

\* cited by examiner

*Primary Examiner*—Igor Kershteyn
(74) *Attorney, Agent, or Firm*—Oblon, Spivak, McClelland, Maier & Neustadt, L.L.P.

(57) ABSTRACT

The balancing flyweight of a turbomachine rotor includes two pyramid shaped end parts each one having a base and an apex, and an intermediate part which connects the two bases of the end parts together. The two apexes are aligned on a longitudinal axis. The two end parts and the intermediate part exhibit, in cross section through a plane perpendicular to said the longitudinal axis, cross-sections having polygonal shapes centered on said longitudinal axis.

19 Claims, 3 Drawing Sheets

US 7,753,651 B2

BALANCING FLYWEIGHT, ROTOR DISK EQUIPPED THEREWITH, ROTOR AND AIRCRAFT ENGINE COMPRISING THEM

BACKGROUND OF THE INVENTION

The present invention relates to the technical field of balancing turbomachine rotors.

It relates more particularly to a balancing flyweight for a turbomachine rotor.

It also relates to a disk of a turbomachine rotor equipped with such a flyweight.

It furthermore relates to a turbomachine rotor comprising such a disk.

Finally, it relates to a turbomachine comprising such a rotor. The turbomachine can in particular be an aircraft engine.

In the following text, the term "axial" refers to an axial direction of the turbomachine, the term "longitudinal" refers to a longitudinal direction of the balancing flyweight, whilst the term "transverse" is used for a transverse direction of the turbomachine or of the balancing flyweight.

DESCRIPTION OF THE PRIOR ART

It is known to use balancing flyweights for balancing a turbomachine rotor. Conventionally, a rotor comprises several disks, and the balancing flyweights are mounted on the two downstream disks of the rotor, which are disks carrying detachable blades.

FIG. 1 shows a balancing flyweight of the prior art. FIGS. 2, 3 and 4 show a turbomachine rotor provided with such known balancing flyweights.

In FIG. 2, shown in axial cross-section, is a turbomachine rotor 110, and more particularly two disks 112, 132 corresponding to two successive stages N, N−1 of that rotor 110.

At the periphery of the disk 112 of the stage N, are distributed cells 114 each of which receives the root 116 of a detachable blade 118. A balancing flyweight 160 is disposed in a gap 120 formed between two successive blade roots 116, 116'. Similarly, at the periphery of the disk 132 of the stage N−1, are distributed cells 134 each of which receives the root 136 of a detachable blade 138. A balancing flyweight 180 is disposed in a gap 140 formed between two successive blade roots 136, 136'.

In a known manner, the balancing flyweights 160, 180 are positioned in the gaps 120, 140, in such a way that two active faces 156 of each flyweight 160, 180 are in contact with two active sides 104 of the corresponding cell 114, 134, by the centrifugal force when the rotor 110 is driven in rotation.

All of the flyweights 160 of the disk 114 of the stage N are identical with each other. Similarly, all of the flyweights 180 of the disk 134 of the stage N−1 are identical with each other. A typical balancing flyweight 160, 180 of the prior art is shown in perspective in FIG. 1. A local reference system of orthogonal axes (X, Y, Z) is associated with it. It has a body 162, 182, which has hollows 158 produced by machining, in order to optimize its mass. It also has two locating lugs 184 which extend outwards from the body 182 in the transverse direction Y. These locating lugs 184 do not come into contact with the roots 136, 136' of the blades 138, 138' between which the flyweight 180 is disposed, as shown in FIG. 4. The locating lugs 184 make it possible to prevent possible fitting errors which could result in damaging the disks 132.

FIG. 4 shows a transverse cross-sectional view, through the line B-B of FIG. 2, of the disk 132 of the stage N−1 of the rotor 110 of FIG. 2, showing more particularly two adjacent detachable blades 138, 138' having blade roots 136 and 136' respectively, and a balancing flyweight 180 for stage N−1 disposed in the gap 140 formed between the blade roots 136, 136'.

When the flyweight 180 is in position between the two blade roots 136, 136', the plane (X, Z) of the flyweight 180 is merged with the axial cross-section plane which is the plane of FIG. 2, and the plane (Y, Z) of the flyweight 180 is merged with the transverse cross-section plane which is the plane of FIG. 4. In other words, when the flyweight 180 is in position between the two blade roots 136, 136', its axis X is parallel with the axial direction of the turbomachine, and its axes Y and Z define a plane parallel with a transverse plane of the turbomachine.

FIG. 3 shows a transverse cross-sectional view through the line A-A of FIG. 2, of the disk 112 of the stage N of the rotor 110 of FIG. 2, showing more particularly two adjacent detachable blades 118, 118' having blade roots 116 and 116' respectively.

As they belong to two different stages N, N−1, the two disks 112, 132 have cells 114, 134 of different dimensions, in particular along their radial direction. In fact, it can be seen in FIGS. 2, 3 and 4 that the radial dimension of the cell 134 of the disk 132 of the stage N−1 (on the right in FIG. 2) is less than the radial dimension of the cell 114 of the disk 112 of the stage N (on the left in FIG. 2). Consequently, it is necessary to provide flyweights 160, 180 with slightly different shapes and/or dimensions depending on whether they are intended for the disk 112 of the stage N or the disk 132 of the stage N−1 of the rotor 110.

This situation is illustrated in FIG. 3, which shows a balancing flyweight 180 adapted for the disk 132 of the stage N−1, placed between the two successive blade roots 116 and 116'. Since the cells 114, 134 of the two disks 112, 132 have different dimensions, the flyweight 180 adapted for the disk 132 of the stage N−1 is not adapted for the disk 112 of the stage N, as illustrated by overlapping zones 108 of the locating lugs 184 with the blade roots 116, 116'. If the balancing flyweight 180 of the stage N−1 was disposed in the gap 120 of stage N in such a way as to avoid such overlapping, then its active faces 156 would not be in contact with the active sides 104 of the cell 114 during the rotation of the disk 112.

Consequently, it proves impossible to place identical flyweights 180 in the cells 114, 134 of two different disks 112, 132, when these flyweights have the geometry of the flyweight 180 shown in FIG. 1.

SUMMARY OF THE INVENTION

An objective of the present invention is to propose a balancing flyweight of a shape and dimensions such that it can be placed indifferently in the cells of a disk of a stage N and in the cells of a disk of a stage N−1.

Another objective of the present invention is to propose a balancing flyweight of a shape and dimensions such that it can be placed correctly in the cell without it being necessary to provide locating protrusions.

The above objectives and other objectives are achieved with a balancing flyweight according to the invention.

According to a first aspect, the invention relates to a balancing flyweight of a turbomachine rotor, wherein it comprises two pyramid-shaped end parts each one having a base and an apex, and an intermediate part which connects the two bases of the end parts.

According to one feature, the two apexes are aligned on a longitudinal axis.

According to one feature, the two end parts and the intermediate part exhibit, in cross-section through said longitudinal axis, cross-sections having polygonal shapes centered on said longitudinal axis.

According to one feature, said balancing flyweight comprises a median plane of symmetry perpendicular to said longitudinal axis.

According to one feature, said balancing flyweight exhibits rounded edges and rounded apexes.

According to one feature, said balancing flyweight exhibits a hollow. Preferably, said hollow is in the form of a traversing hole oriented in a direction perpendicular to said longitudinal axis.

According to a preferred embodiment, said polygons are four-sided polygons, such that each end part has the shape of a pyramid with four faces and such that the intermediate part has the shape of a parallelepiped.

According to a preferred variant embodiment, said four-sided polygons are rectangles.

According to another preferred variant of the preferred embodiment, said four-sided polygons are squares.

According to this preferred variant, said balancing flyweight comprises eight active faces which are the eight faces of the two end parts.

According to a second aspect, the invention relates to a rotor disk of a turbomachine, provided with at least one balancing flyweight according to the first aspect.

In particular, said rotor disk of a turbomachine comprises cells in which are inserted blade roots between which is formed a gap in a direction tangential to the disk, and said cells have two active sides.

Said rotor disk is characterized in that it is provided with at least one balancing flyweight according to the first aspect disposed in said gap.

Preferably, said balancing flyweight comprises two active faces each disposed on one of the end parts.

Preferably, these two active faces are symmetrical with each other with respect to a median plane of symmetry perpendicular to a longitudinal axis which connects the two apexes (66) of the flyweight (50).

Preferably, said active faces are intended to respectively come into contact with one of the active sides of the cell when said rotor disk is driven in rotation.

According to a third aspect, the invention relates to a turbomachine rotor comprising a balancing flyweight according to the first aspect and/or to a rotor disk according to the second aspect of the invention.

According to a fourth aspect, the invention relates to a turbomachine comprising a balancing flyweight according to the first aspect and/or to a rotor disk according to the second aspect and/or to a rotor according to the third aspect of the invention. In particular, the turbomachine is an aircraft engine.

BRIEF DESCRIPTION OF THE DRAWINGS

The invention will be better understood on reading the following detailed description of an embodiment of the invention, given as an illustration and in no way limiting, with reference to the appended drawings, in which.

DESCRIPTION OF THE PREFERRED EMBODIMENT

Figure 5:
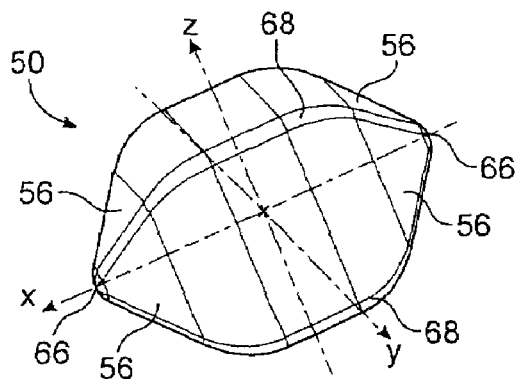
FIG. 5 is a perspective view of a balancing flyweight according to the invention.

Referring firstly to FIG. 5, a balancing flyweight 50 according to the invention is shown in perspective. The latter has a generally oblong shape extending along a longitudinal axis X. A local orthogonal system of reference axes (X, Y, Z) is associated with it in such a way that the plane (Y, Z) is a median transverse plane of the balancing flyweight 50 and that the plane (Z, X) is a longitudinal plane, perpendicular to the median plane (Y, Z).

Figure 1:
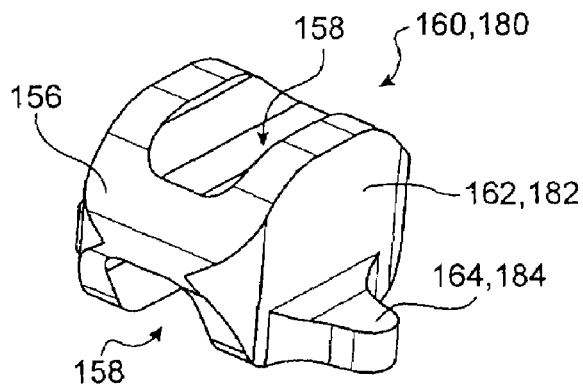
FIG. 1, already described, is a perspective view of a balancing flyweight according to the prior art.
Figure 6:
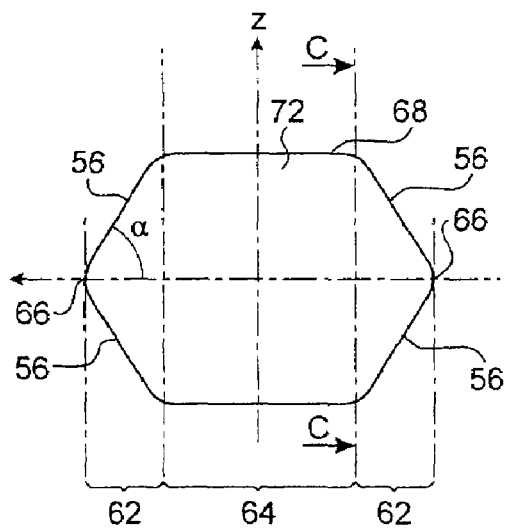
FIG. 6 is another view in longitudinal cross-section of a balancing flyweight according to the invention.

The balancing flyweight 50 is shown in cross-section through the longitudinal plane (X, Z) in FIG. 6. It comprises three successive parts, namely two end parts 62 connected to each other by an intermediate part 64. The two end parts 62 are each shaped like a pyramid having a base 70, an apex 66 and four faces 56. The intermediate part 64 has a parallelepipedal shape having four faces 72 of the same dimensions. The intermediate part 64 connects the two bases 70 of the two end parts, in a continuous and regular manner, parallel with the longitudinal axis X upon which the two apexes 66 are aligned. The faces 72 of the intermediate part 64 are in the extension of the respective faces 56 of the end parts 62.

Figure 7:
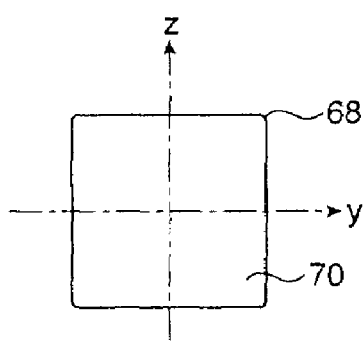
FIG. 7 is another view in transverse cross-section through the line C-C of FIG. 6 of a balancing flyweight according to the invention.
Figure 2:
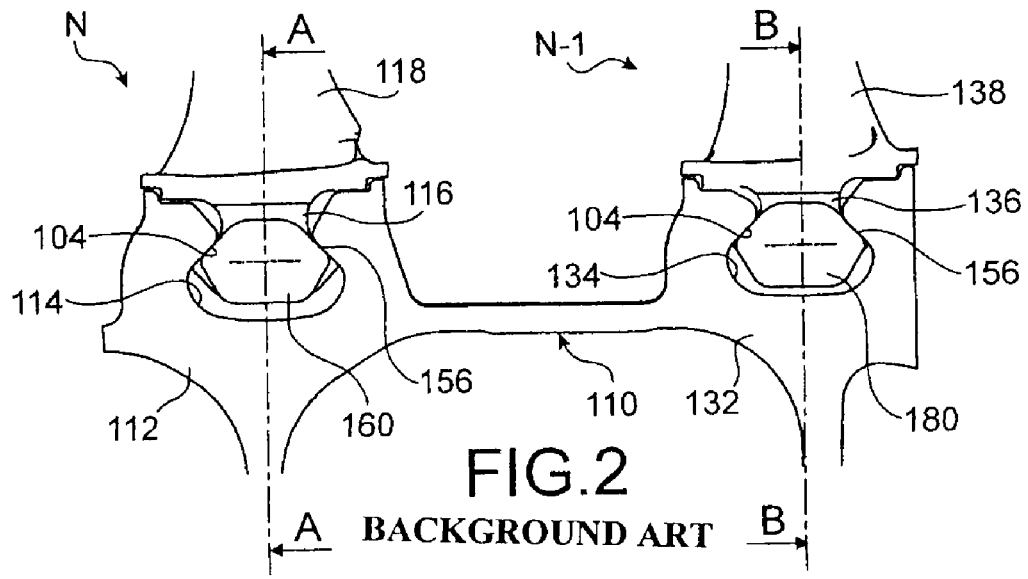
FIG. 2, already described, shows, in axial cross-section, two successive stages of a turbomachine rotor, provided with balancing flyweights according to the prior art.
Figure 3:
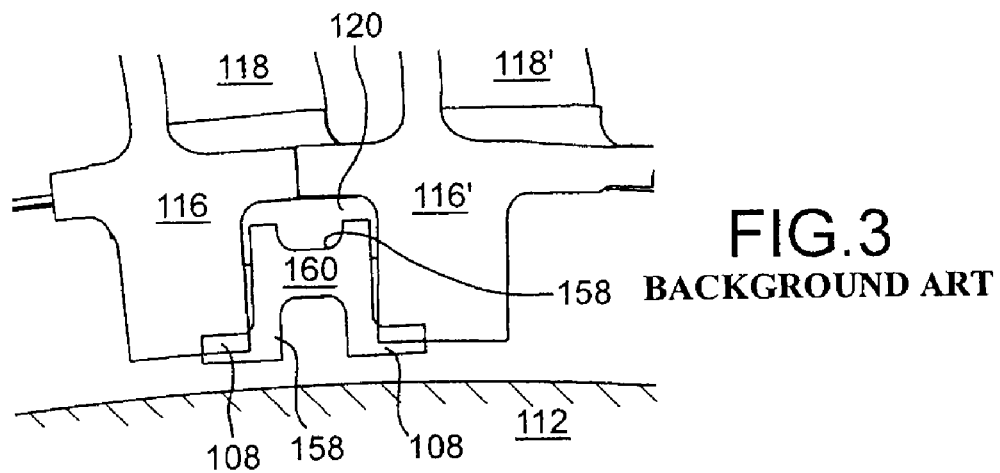
FIG. 3, already described, is a transverse cross-sectional view through the line A-A of FIG. 2.
Figure 4:
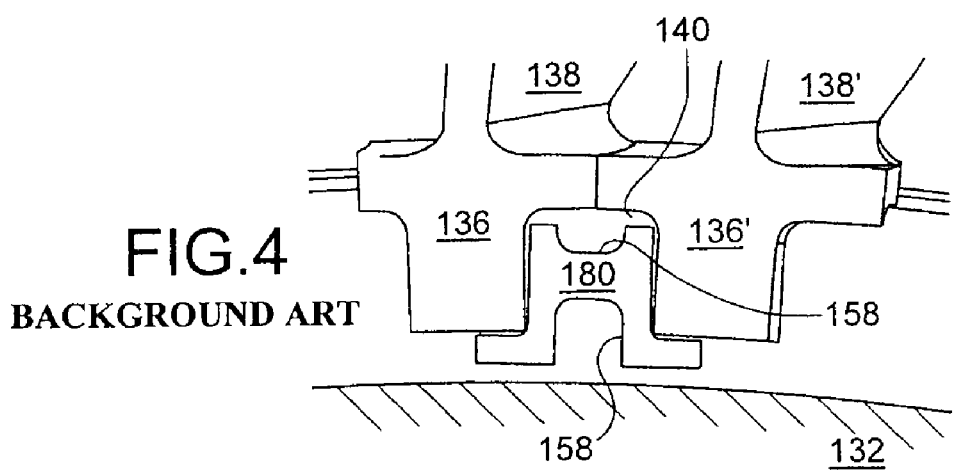
FIG. 4, already described, is a transverse cross-sectional view through the line B-B of FIG. 2.

The balancing flyweight 50 has transverse cross-sections, perpendicular to the longitudinal axis X, having square shapes, as illustrated in FIG. 7 which shows the balancing flyweight 50 in cross-section through a transverse plane (Y, Z) corresponding to the line C-C of FIG. 6, at the junction between the intermediate part 64 and one of the end parts 62. The axes Y and X are positioned such that each one of them passes through the centers of two opposite faces 72 of the intermediate part 64.

Between its various faces 56, 72, the balancing flyweight 50 preferably has rounded edges. It also preferably has rounded apexes 66.

The inclination of the faces 56 of the end parts 62 is defined by an angle α, whose value depends on requirements. This angle α is contained in the range from 30 degrees to 60 degrees, preferably within a range from 40 degrees to 55 degrees. In an even more preferred manner, the value of the angle α is set at 45°.

One advantage of a balancing flyweight 50 having the shape that has just been described is the fact that it has several planes of symmetry, and retains the same contour in the longitudinal plane (Z, X) when it is pivoted through 90° about the longitudinal axis X.

Figure 8:
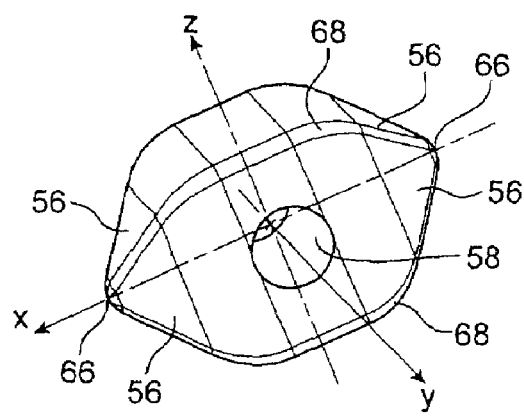
FIG. 8 is a view similar to FIG. 5, for a variant embodiment of the balancing flyweight according to the invention.

FIG. 8 shows a variant embodiment of the balancing flyweight 50. The latter has a hollow 58, preferably formed by machining, in order to modify and/or optimize its mass. In the illustrated example, the hollow 58 is in the form of a traversing hole 58 oriented perpendicular to the longitudinal axis X and passing through one or the other of the transverse axes Y or Z. The shape and the position of the hollow 58 does not affect the contour of the balancing flyweight 50 when it is seen in one or other of the transverse planes (X, Y) or (Z, X).

One advantage of the invention is the fact that a unique shape and unique dimensions are provided for all of the balancing flyweights 50, whatever the disk 12, 32 on which they are intended to be installed may be. This makes it possible to simplify the manufacture of the balancing flyweights and to reduce the costs of this manufacturing.

The balancing flyweight according to the invention is preferably made from a material chosen from the group constituted by nickel-based alloys, titanium-based alloys, aluminum-based alloys and steels.

Figure 9:
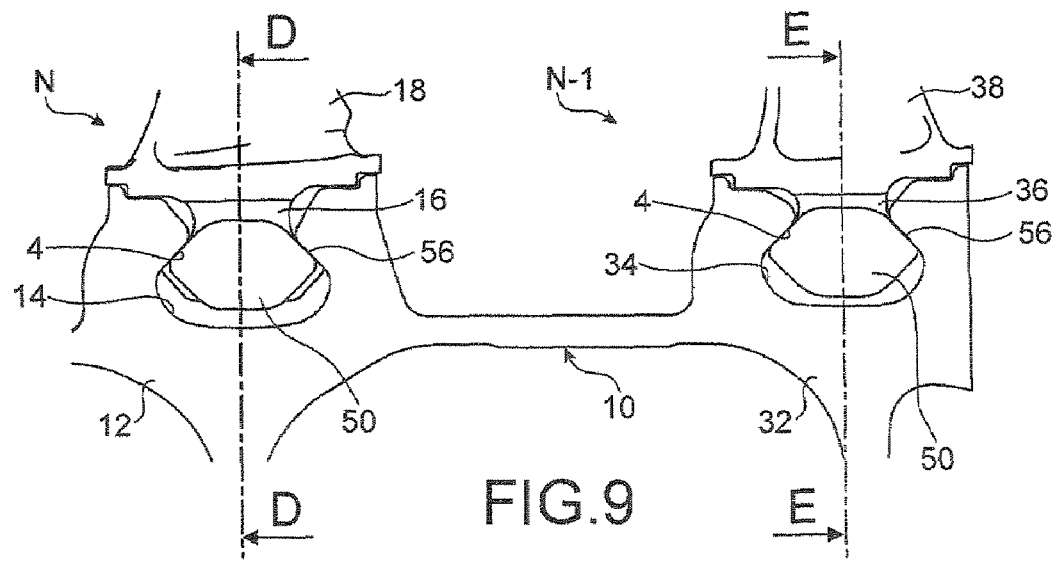
FIG. 9 shows, in axial cross-section, two successive stages of a turbomachine rotor, provided with balancing flyweights according to the invention.

FIG. 9 shows an axial cross-sectional view of a turbomachine rotor 10 according to the invention and more particularly two disks 12, 32 corresponding to two successive stages N, N−1 of that rotor 10.

Cells 14 each of which receives the root 16 of a detachable blade 18 are distributed at the periphery of the disk 12 of the stage N. A balancing flyweight 50 according to the invention is disposed in a gap 20 formed between two successive roots 16. Similarly, cells 34 each of which receives the root 16 of a detachable blade 38 are distributed at the periphery of the disk 32 of the stage N−1. A balancing flyweight 50 according to the invention is disposed in a gap 40 formed between two successive roots 36.

Figure 10:
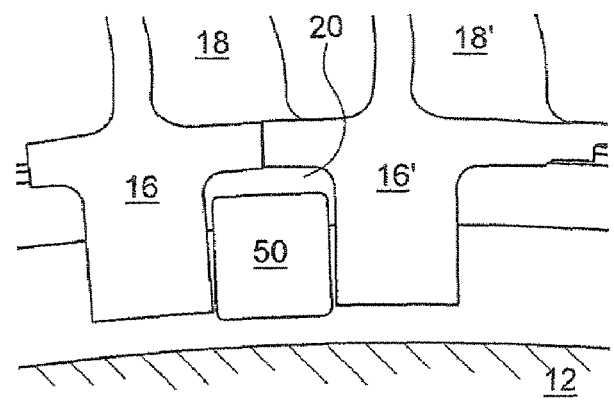
FIG. 10 is a view in transverse cross-section through the line D-D of FIG. 9.

FIG. 10 is a transverse cross-sectional view through the line D-D of FIG. 9, of the disk 32 of the stage N of the rotor 10 of FIG. 9, showing more particularly two adjacent detachable blades 18, 18' having blade roots 16 and 16' respectively, and a balancing flyweight 50 disposed in the gap 20 formed between them.

Figure 11:
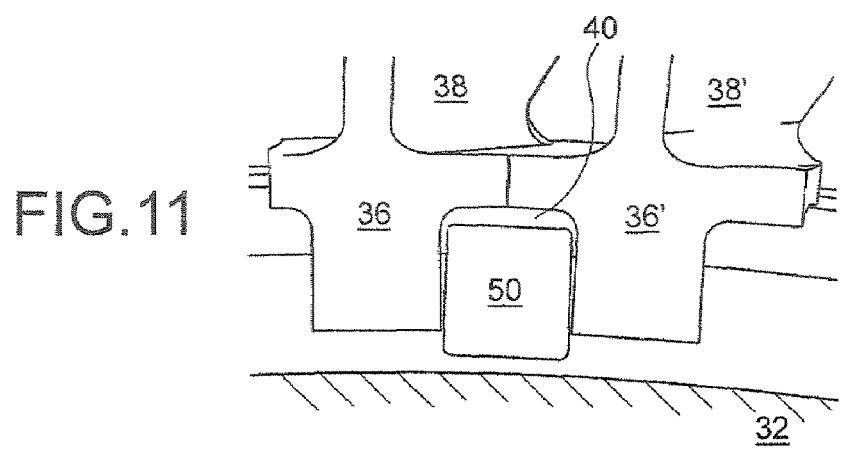
FIG. 11 is a view in transverse cross-section through the line E-E of FIG. 9.

Similarly, FIG. 11 is a transverse cross-sectional view through the line E-E of FIG. 9, of the disk 32 of the stage N−1 of the rotor 10 of FIG. 9, showing more particularly two adjacent detachable blades 38, 38' having blade roots 36 and 36' respectively, and a balancing flyweight 50 disposed in the gap 40 formed between them.

All of the flyweights 160 of the disk 114 of the stage N are identical with each other. Similarly, all of the flyweights 180 of the disk 134 of the stage N−1 are identical with each other. Moreover, the flyweights 50 disposed in the stage N disk (FIG. 10 and the left-hand part of FIG. 9) are identical with the balancing flyweights 50 disposed in the stage N−1 disk (FIG. 11 and the right-hand part of FIG. 9).

The balancing flyweights 50, 50 are positioned between two successive blade roots 16, 16', 36, 36' in the gap 20, 40 (FIGS. 10, 11), such that two active faces 56, 56 of each flyweight 50 are in contact with two active sides 4, 4 of the corresponding cell 14, 34, by centrifugal force when the rotor 10 is driven in rotation (FIG. 9). The two active faces 56, 56 which come into contact with the active sides 4, 4 of the corresponding cell 14, 34 are symmetrical with each other with respect to the median plane of symmetry (Y, Z) of the balancing flyweight 50.

As shown more particularly in FIGS. 10 and 11, the gaps 20, 40 have a substantially square shape in a transverse plane of the disk 12, 32. By choosing a polygon with four equal sides, that is to say a square, for defining the cross-section of the intermediate part 64, a possible rotation of the balancing flyweight 50 about its longitudinal axis X once it is positioned in the cell 14, 34 is prevented. Consequently, the risks of damaging the cell 14, 34 and/or the flyweight 50 are reduced.

These risks are further reduced by the fact that the balancing flyweight 50 is provided with rounded edges 68 and with rounded apexes 66.

Because of its special shape having two longitudinal planes of symmetry (Y, Z) and (Z, X), each balancing flyweight 50 can be disposed in the gap 20, 40 without it being necessary to provide a particular direction of insertion and/or locating protrusions. In fact, all of the faces 56 of the end parts 62 are identical. All of them can therefore fulfill the function of an active face coming into contact with an active side 4, 4 of the corresponding cell 14, 34. Consequently, the same shape of balancing flyweight can be envisaged for all of the disks of a rotor which must be balanced. It suffices to choose the dimensions of the common balancing flyweight in such a way that it can enter the cell which has the smallest radial dimension, that is to say the cell 34 of the disk 32 of stage N−1, on the right-hand side of FIG. 9. Consequently, such a balancing flyweight 50 procures a saving in time when the disks 12, 32 are assembled.

The invention is not limited to the previously described embodiment. In particular, the number of faces of each pyramid is not limited to four.

What is claimed is:

1. A rotor disk of a turbomachine, said disk comprising:
cells, said cells having two active sides;
blade roots which are inserted in the cells which form a gap between the blade roots in a direction tangential to the disk; and
at least one balancing flyweight disposed in said gap,
wherein the balancing flyweight comprises first and second pyramid-shaped end parts each of the first and second pyramid-shaped end parts including a base and an apex, and an intermediate part which connects the two bases of the first and second end parts together.

2. The rotor disk as claimed in claim 1, wherein said two apexes are aligned on a longitudinal axis.

3. The rotor disk as claimed in claim 2, wherein the balancing flyweight comprises a plane of symmetry perpendicular to said longitudinal axis.

4. The rotor disk as claimed in claim 1, wherein the balancing flyweight includes a hollow.

5. The rotor disk as claimed in claim 4, wherein said hollow is a traversing hole oriented in a direction perpendicular to a longitudinal axis which connects the two apexes.

6. The rotor disk as claimed in claim 2, wherein the two end parts and the intermediate part exhibit, in cross section through a plane perpendicular to said longitudinal axis, cross-sections having polygonal shapes centered on said longitudinal axis.

7. The rotor disk as claimed in claim 6, wherein said polygons are four sided polygons, such that each end part has the shape of a pyramid with four faces and such that the intermediate part has the shape of a parallelepiped.

8. The rotor disk as claimed in claim 7, wherein said four-sided polygons are rectangles.

9. The rotor disk as claimed in claim 7, wherein said four-sided polygons are squares.

10. The rotor disk as claimed in claim 9, wherein the balancing flyweight includes eight active faces which are the eight faces of the two end parts.

11. The rotor disk as claimed claim 1, wherein the balancing flyweight has rounded edges and rounded apexes.

12. The rotor disk as claimed in claim 1, wherein the balancing flyweight includes at least one of a nickel-based alloy, titanium-based alloy, aluminum-based alloy or steel.

13. The rotor disk as claimed in claim 1, wherein said balancing flyweight comprises two active faces disposed on one of the end parts.

14. The rotor disk as claimed in claim 13, wherein the two active faces are symmetrical with each other with respect to a median plane perpendicular to a longitudinal axis which connects the two apexes of the flyweight.

15. The rotor disk as claimed in claim 14, wherein said active faces respectively come into contact with one of the active sides of the cell when said rotor disk is driven in rotation.

16. A turbomachine rotor comprising at least one rotor disk as claimed in claim 1.

17. A turbomachine, comprising at least one rotor disk as claimed in claim 1.

18. An aircraft engine comprising at least one rotor disk as claimed in claim 1.

19. The rotor disk as claimed in claim 14, wherein an angle of inclination between the longitudinal axis and one of the active faces is between 30 degrees and 60 degrees.

* * * * *